(12) United States Patent
Saito et al.

(10) Patent No.: US 8,176,194 B2
(45) Date of Patent: May 8, 2012

(54) STREAMING DATA PLAYBACK APPARATUS

(75) Inventors: Soichi Saito, Obu (JP); Hideaki Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 131 days.

(21) Appl. No.: 12/584,842

(22) Filed: Sep. 11, 2009

(65) Prior Publication Data
US 2010/0070637 A1 Mar. 18, 2010

(30) Foreign Application Priority Data

Sep. 12, 2008 (JP) ................................. 2008-234754

(51) Int. Cl.
*G06F 15/16* (2006.01)

(52) U.S. Cl. ........................................ 709/231; 709/228

(58) Field of Classification Search .................. 709/226, 709/228, 231, 227; 370/229, 321, 442, 443; 455/41.2, 41.3
See application file for complete search history.

(56) References Cited

U.S. PATENT DOCUMENTS

| | | | | |
|---|---|---|---|---|
| 5,956,321 | A * | 9/1999 | Yao et al. ....................... | 370/230 |
| 6,687,517 | B2 * | 2/2004 | Kinnunen .................. | 455/569.1 |
| 7,050,834 | B2 * | 5/2006 | Harwood et al. ............. | 455/563 |
| 7,162,276 | B2 * | 1/2007 | Iwase ........................ | 455/569.1 |
| 7,228,202 | B2 * | 6/2007 | Carlson et al. ................ | 700/245 |
| 7,873,392 | B2 * | 1/2011 | Matsuda ................... | 455/569.2 |
| 2002/0032048 | A1 * | 3/2002 | Kitao et al. .................... | 455/569 |
| 2002/0103622 | A1 * | 8/2002 | Burge .......................... | 702/183 |
| 2002/0132632 | A1 | 9/2002 | Brassil et al. | |
| 2002/0146067 | A1 | 10/2002 | Brassil et al. | |
| 2003/0079008 | A1 * | 4/2003 | Fujii et al. ..................... | 709/223 |
| 2004/0151285 | A1 * | 8/2004 | Sychta ....................... | 379/88.16 |
| 2005/0076284 | A1 * | 4/2005 | Dottling et al. ............... | 714/749 |
| 2006/0116075 | A1 | 6/2006 | Gallo | |
| 2007/0147794 | A1 * | 6/2007 | Araki ........................... | 386/125 |
| 2007/0178838 | A1 * | 8/2007 | Matsuda ..................... | 455/41.2 |
| 2007/0178944 | A1 * | 8/2007 | Mitsuru et al. ............. | 455/569.1 |
| 2008/0040759 | A1 * | 2/2008 | She et al. ....................... | 725/81 |
| 2008/0051156 | A1 * | 2/2008 | Matsuda .................. | 455/569.2 |
| 2008/0299908 | A1 * | 12/2008 | Tanada .......................... | 455/41.3 |

FOREIGN PATENT DOCUMENTS

| | | |
|---|---|---|
| JP | 2002-330141 | 11/2002 |
| JP | 2003-309541 | 10/2003 |
| JP | 2008-300954 | 12/2008 |

* cited by examiner

*Primary Examiner* — Ario Etienne
*Assistant Examiner* — Sargon Nano
(74) *Attorney, Agent, or Firm* — Harness, Dickey & Pierce, PLC

(57) ABSTRACT

A handsfree apparatus performs an operation for requesting a connection of a Bluetooth connection link to a cellular phone after guaranteeing a continuous playback of music streaming data by an audio player in a time slot that does not have packet transfer of the music streaming data, if the connection request of the Bluetooth connection link to the cellular phone is generated during a time of A2DP connection that defines packet transfer of the music streaming data with the audio player. The connection request of the Bluetooth connection link to the cellular phone is thus handled appropriately without interrupting a continuous playback of the music streaming data.

3 Claims, 5 Drawing Sheets

STREAMING DATA PLAYBACK APPARATUS

CROSS REFERENCE TO RELATED APPLICATION

The present application is based on and claims the benefit of priority of Japanese Patent Application No. 2008-234754, filed on Sep. 12, 2008, the disclosure of which is incorporated herein by reference.

FIELD OF THE INVENTION

The present disclosure generally relates to a streaming data playback apparatus with a short range wireless communication capability.

BACKGROUND INFORMATION

As one of the Bluetooth (registered trademark: abbreviated as "BT" hereinafter) standard communication protocols, Advanced Audio Distribution Profile (A2DP) is available for controlling packet transfer of music streamlining data. A2DP transfers the music streaming data by compressing the data on the transferring side in Sub-band Coding (SBC) format, MP3 (MPEG Audio Layer-3) format, Adaptive Transform Acoustic Coding format or the like in a unit of packets, as shown, for example, in Japanese patent document JP-A-2003-309541.

BT devices having BT communication capability are configured to continuously transmit a page command to a requesting BT device until the requesting device responds to the page command, or for a preset page command transmission time of, for example, 5.12 seconds, when a BT device generates a request for a BT connection link. On the other hand, some of the BT devices are capable of establishing multiple BT connection links with multiple BT devices at the same time in recent years. The BT capable cellular phones and BT capable music players are the examples of the so-called multi-connection BT devices.

In view of the above-described situations, there is a case that the multi-connection BT handsfree apparatus for use in a vehicle with a BT cellular phone and a BT audio player brought into a vehicle compartment at the same time has a request of BT connection link generated, for example, by the BT cellular phone that has just been turned on, while the handsfree apparatus is having an A2DP link with the BT audio player for continuously playing back the music streaming data transferred from the audio player.

However, in the above-described case, due to the continuous transmission of the page command from the handsfree apparatus to the requesting device, or to the cellular phone in this case, until the cellular phone responds to the command or until the preset time elapses, there may be a problematic situation. That is, in a certain time slot that does not have the packet transfer of the music streaming data from the audio player, the continuous transmission of the page command from the handsfree apparatus causes no problem. However, if the audio player is continuously transferring data packets of the music streaming data in a certain time slot, the BT communication band may be occupied by the transmission of the page command from the handsfree apparatus to the requesting cellular phone, thereby interrupting the music streaming data transferred from the audio player and disabling the reception of the music streaming data by the handsfree apparatus, as shown in FIG. 5. As a result, the user of the handsfree apparatus may be disrupted and discomforted by the interrupted playback of the music performed by the handsfree apparatus.

SUMMARY OF THE INVENTION

In view of the above and other problems, the present disclosure provides a handsfree apparatus that appropriately handles a request from one device for establishing a short range wireless communication link while preventing interruption of playback of streaming data transferred from other device by using a packet transfer protocol for streaming data used in the short range wireless communication.

According to one aspect of the present disclosure, the streaming data playback apparatus includes: a short range wireless communication unit capable of simultaneously establishing multiple links of short range wireless communication with multiple short range wireless communication devices; a streaming data storage unit for storing streaming data that has been transferred from the short range wireless communication device when a short range wireless communication with a short range wireless communication device is connected through a short range wireless communication protocol that regulates a packet transfer of the streaming data; a streaming data playback unit for continuously playing the streaming data stored in the streaming data storage unit; and a control unit for controlling a request operation that requests a connection of a short range wireless communication link to the short range wireless communication device by the short range wireless communication unit. The control unit causes the short range wireless communication unit to perform the request operation that requests a connection of the short range wireless communication link to one of the multiple short range wireless communication devices, when (a) a connection request of the short range wireless communication link to one of the multiple short range wireless communication devices is generated at a time during which the short range wireless communication unit is in a short range wireless communication protocol connected condition that regulates the packet transfer of the streaming data with other short range wireless communication device, (b) with a reservation that the streaming data stored in the streaming data storage unit can be continuously played in a time slot that does not have the transfer of the data packet of the streaming data from the other short range wireless communication device.

According to the above operation scheme, the requested connection to one of the multiple short range wireless communication devices is established while continuous playback of the music streaming data is guaranteed in a time slot that has the data packet transmission of the streaming data from the other short range communication device. Therefore, disruption and discomfort of the user of the handsfree apparatus are prevented due to the appropriate handling of the request connection operation of the short range wireless communication link without interruption of the continuous playback of the music streaming data transferred from the other communication device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
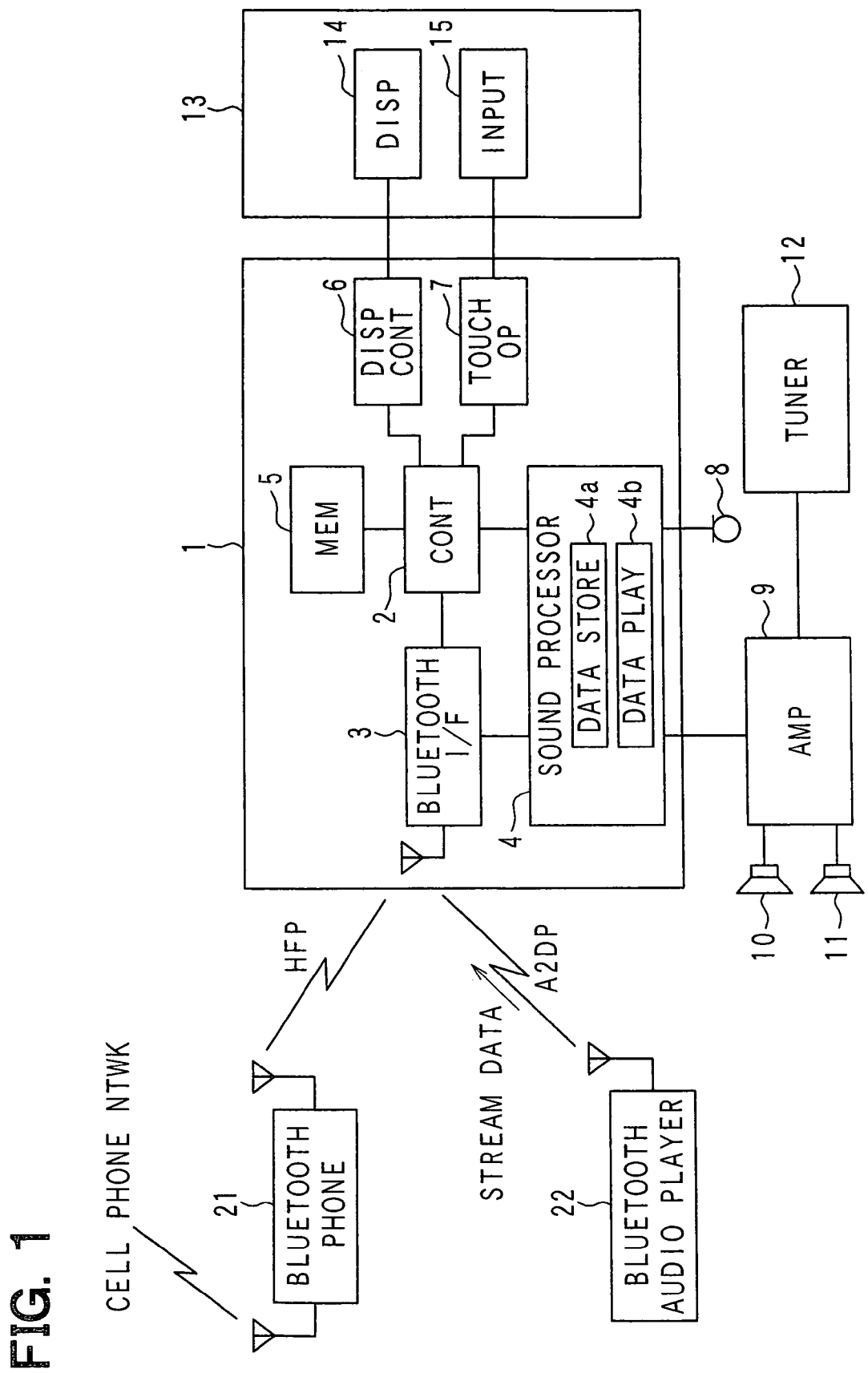
FIG. 1 is a block diagram of functions in an embodiment of the present disclosure.

The following description describes, with reference to FIGS. 1 to 4, a vehicle handsfree apparatus (designated as a handsfree apparatus hereinafter) in the present invention applicated form. The handsfree apparatus is disposed in a vehicle compartment, and has a Bluetooth (a registered trademark) communication capability. The Bluetooth is abbreviated to BT in the following description. The handsfree apparatus 1 includes a control unit 2 (a control unit in the claim language), a BT interface unit 3 (a short range wireless communication unit in the claim language), a sound processor 4, a memory unit 5, a display control unit 6, and a touch operation input unit 7. The control unit 2 has a CPU, a RAM, a ROM and an input/output (I/O) bus, and controls the entire operation such as communication operation and/or data management operation of the handsfree apparatus 1.

The BT interface unit 3 can establish multiple BT connection links (a short range wireless communication link in the claim language) with multiple BT devices simultaneously, and can use multiple "profiles" of BT communication standard such as A2DP (Advanced Audio Distribution Profile) defining packet transfer to music streaming data, HFP (Hands Free Profile) defining a handsfree call, PBAP (Phone Book Access Profile) defining packet transfer of telephone book data, outbound call history data and inbound call history data. These profiles are protocols for the short range wireless communication in the claim language, and are defined for enabling specific functions.

The sound processor 4 connects, for example, a microphone 8 disposed at a position for an easy input of user's voice such as a proximity of a steering wheel or the like. The processor 4 also connects an audio amplifier 9 disposed on an outside of the handsfree apparatus 1. The sound processor 4 receives input of user's voice from the microphone 8 as outbound voice data, and outputs the input of the outbound voice data to the BT interface unit 3 when a BT capable cellular phone 21 (i.e., BT phone 21 hereinafter) is brought into the vehicle compartment as one of the multiple short range wireless communication devices having BT capability with HFP established between the cellular phone 21 and the BT interface unit 3. When the sound processor 4 receives inbound voice data from the BT interface unit 3, it outputs the input of the inbound voice data to the audio amplifier.

Further, the sound processor 4 has a data store unit 4a (a streaming data storage unit in the claim language) and a data play unit 4b (a streaming data playback unit in the claim language). When the processor 4 receives streaming data from the BT device during an establishment of a packet transfer profile of streaming data, the processor 4 stores the data in the above store unit 4a, and plays the stored data in the store unit 4a by using the play unit 4b for outputting to the audio amplifier 9.

In other words, when the sound processor 4 receives the music streaming data through the BT interface unit 3 from a BT capable audio player 22 while (a) the audio player 22 is brought into the vehicle and (b) A2DP is connected between the BT interface unit 3 and the audio player 22, the processor 4 plays the music streaming data stored in the store unit 4a by the play unit 4b, and output to the audio amplifier 9. The "streaming" in the present context means a method that plays data while it is received at the same time.

When the audio amplifier 9 receives inputs, from the sound processor 4, inbound voice data and/or music streaming data, it amplifies the received data for outputting from speakers 10, 11. In this case, the amplifier 9 is also connected to a tuner deck 12, and receives inputs such as radio program data or music data stored in a music record medium from the deck 12 for outputting the music/radio program data after amplification from the speakers 10, 11.

The memory unit 5 is capable of storing a control program and various data which are executed by the control unit 2. The various data includes data such as (a) telephone book data representing relation between telephone numbers and registration names, (b) outbound call history data representing relation between call times and telephone numbers of outbound calls placed by the handsfree apparatus 1 or by the BT phone 21 connected with the handsfree apparatus 1 through HFP, (c) inbound call history data representing relation between call times and telephone numbers of inbound calls received by the BT phone 21 connected with the handsfree apparatus 1 through the HFP.

A display 13 includes a display unit 14 for displaying a screen and a touch operation input device 15 for touch interface on the screen. The display control unit 6 controls display operation of the display unit 14 according to display instruction signals from the control unit 2. The touch operation input unit 7 outputs, upon detecting input of operation detection signals from the touch operation input device 15 according to operation of the touch switch on the screen, the operation detection signals to the control unit 2. Then, the control unit 2 analyses the operation detection signals for processing upon having the signals from the touch operation input unit 7.

Figure 2:
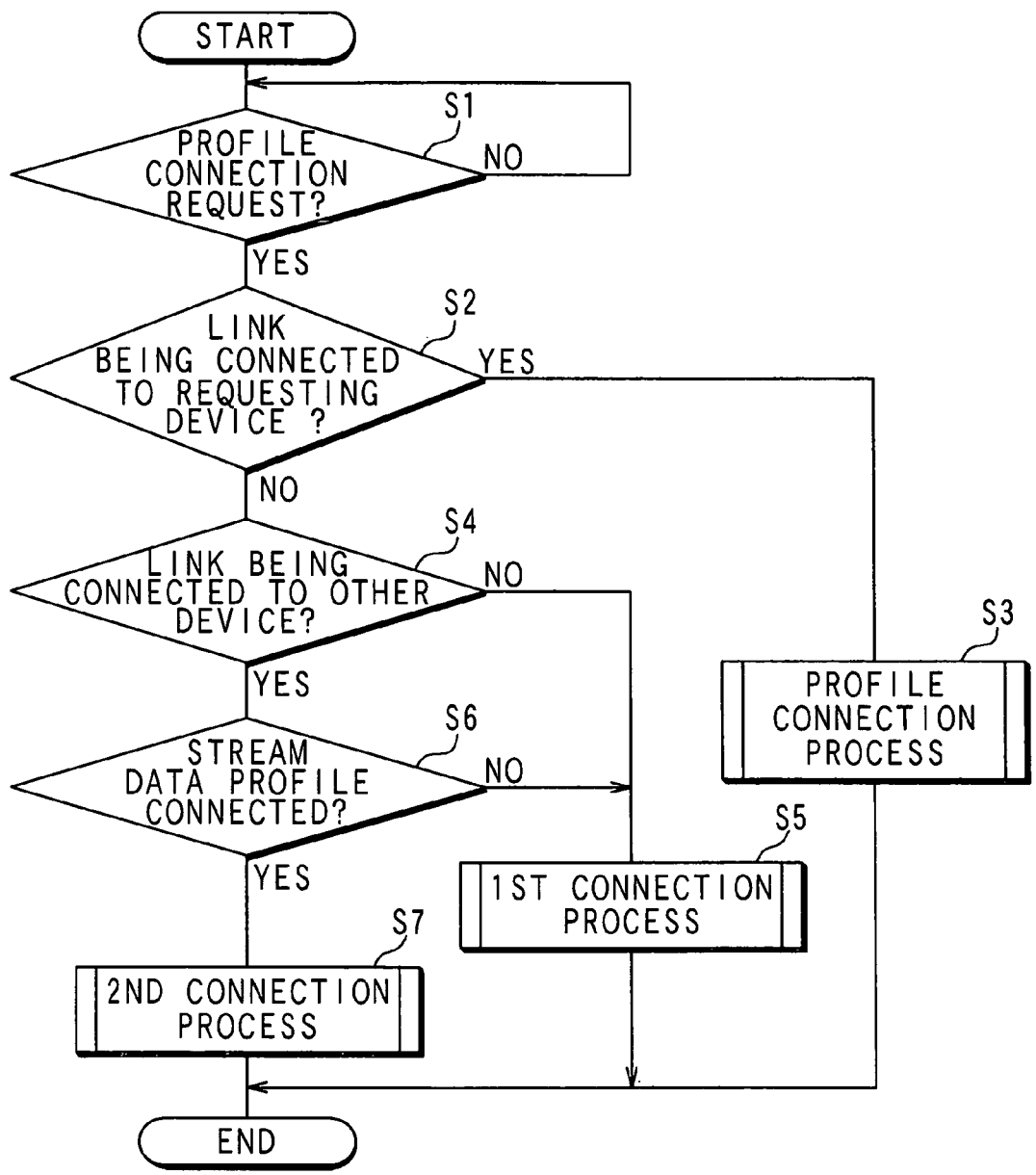
FIG. 2 is a flowchart of a process in the embodiment of the present disclosure.
Figure 3:
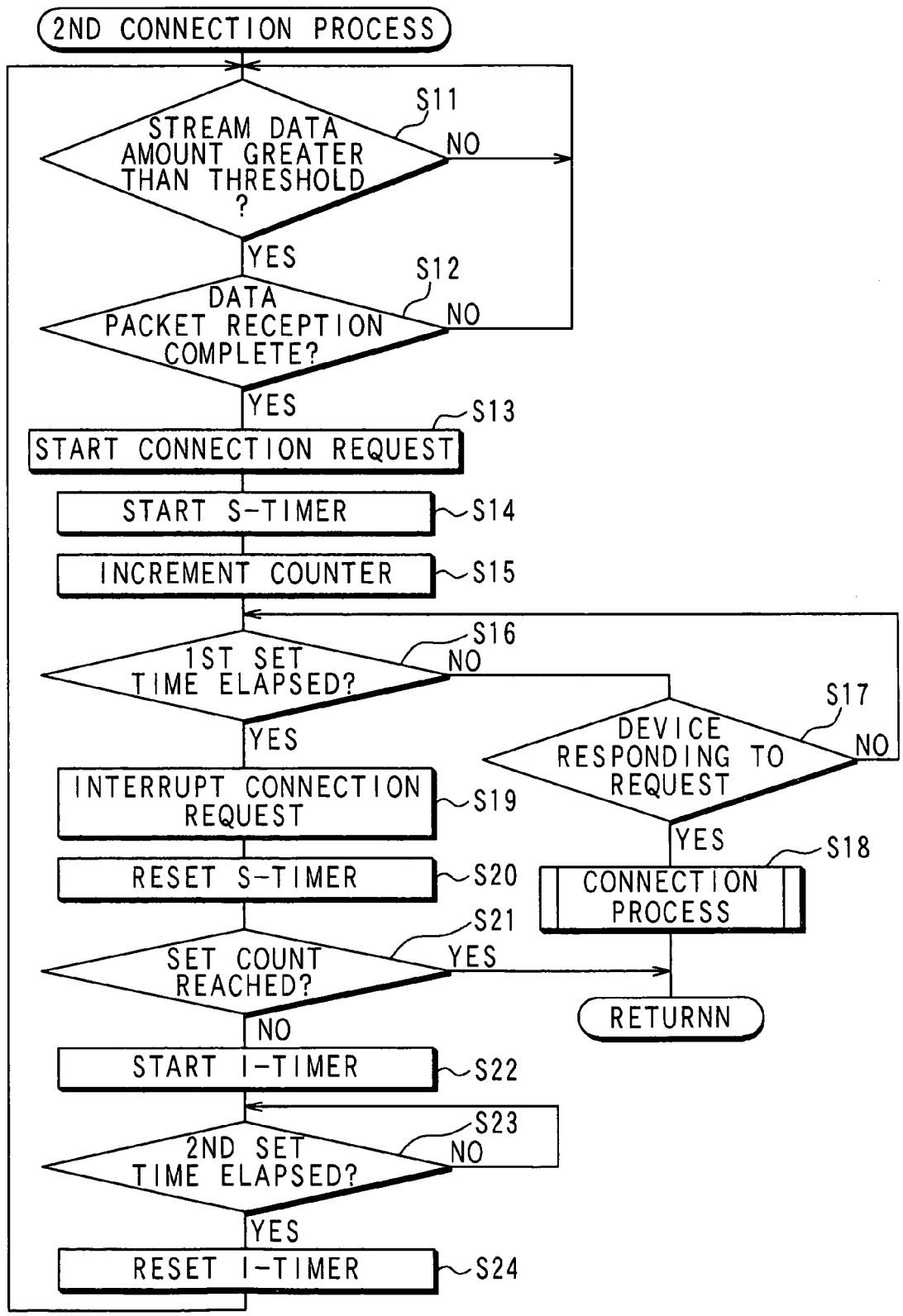
FIG. 3 is a flowchart of another process in the embodiment of the present disclosure.
Figure 4:
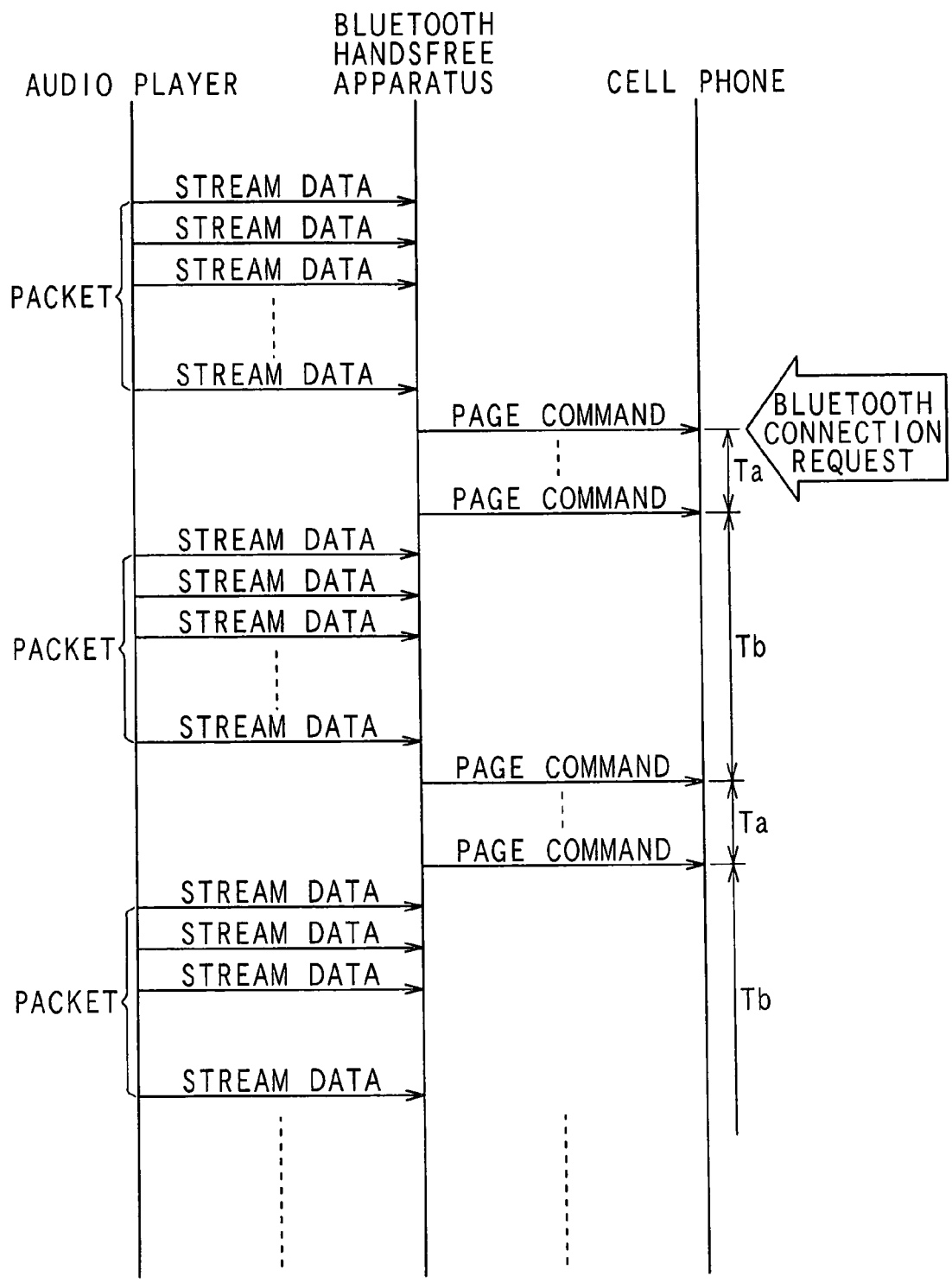
FIG. 4 is a sequence chart of inter-related devices in the embodiment of the present disclosure.
Figure 5:
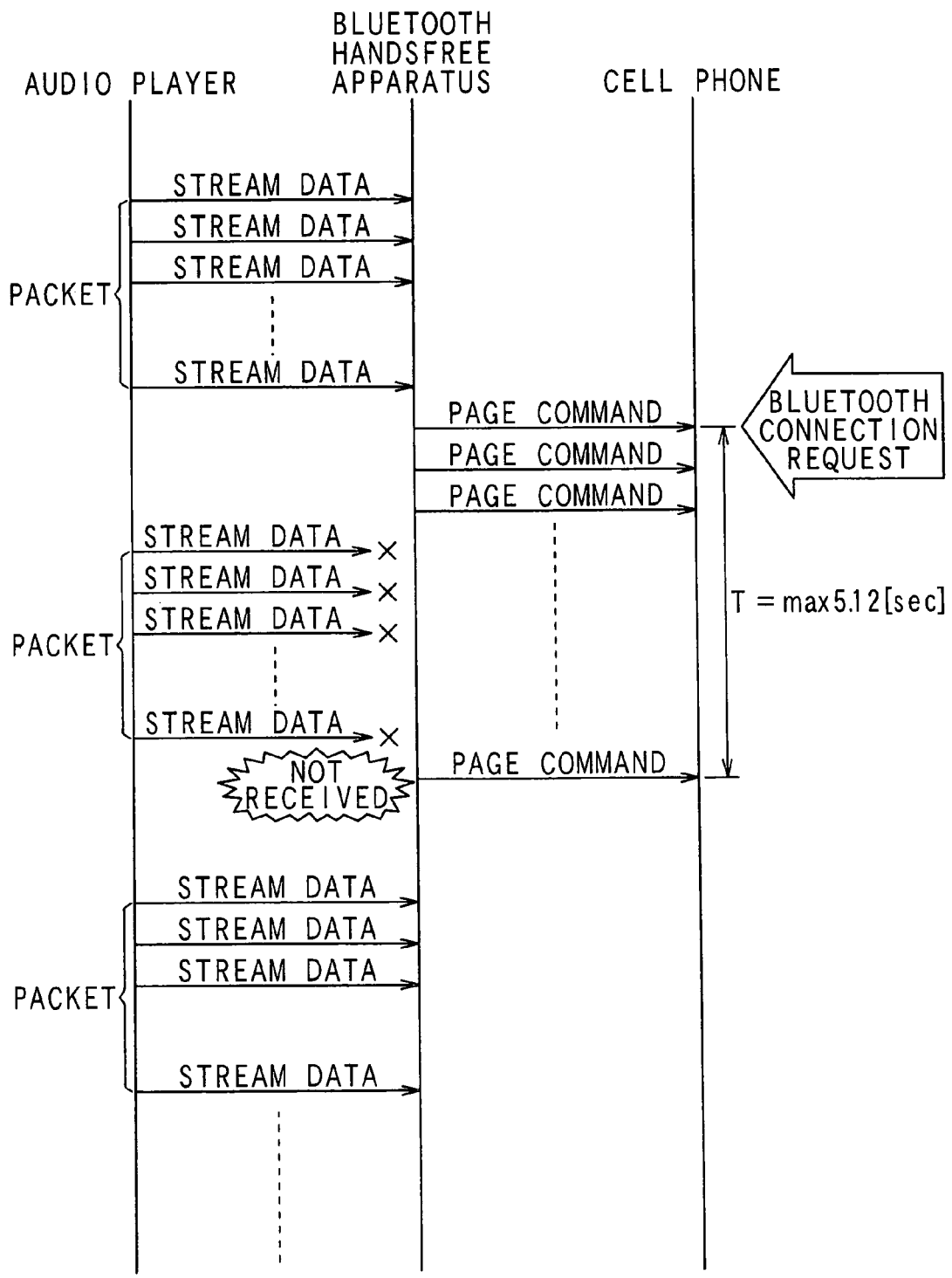
FIG. 5 is a sequence chart of a conventional process of relevant art.

The operational effect of the above configuration is explained referring to FIGS. 2 to 4.

The control unit 2 in a power supplied condition determines whether a profile connection request to one of the BT devices is generated or not in the handsfree apparatus 1 (step S1). If the request is determined as generated by the control unit 2 (step S1, YES), the control unit 2 then determines whether a BT connection link is being connected to the requesting device (step S2).

When the control unit 2 determines that a BT connection link to the requesting BT device is being connected (step S2, YES), the process proceeds to profile connection processing to connect a profile to the requesting BT device which serves as a partner requesting a connection of the profile from among the multiple BT devices (step S3).

In contrast, when the control unit 2 determines that a BT connection link to one requesting BT device is not being connected with the connection request partner of the profile (step S2, NO), the control unit 2 then determines whether the BT interface unit 3 is already connecting a BT connection link to other BT device at the moment (step S4).

Subsequently, the control unit 2 proceed to the first BT connection request processing (step S5) when determining that the BT interface unit 3 is not already connecting a BT connection link to other BT device at the moment (step S4, NO). The first BT connection request processing mentioned here is processing to transmit a page command in succession until the requesting BT device responds or until a preset time elapses. Further, the preset time mentioned here is, for example, 5.12 seconds.

In contrast, when the control unit 2 determines that the BT interface unit 3 is connecting a BT connection link to other BT device at the moment (step S4, YES), the control unit 2 then determines whether a profile defining streaming data packet transfer is being connected to the other BT device to which the BT connection link is already being connected (step S6). Then, if the streaming data packet transfer profile is determined as not being connected to the other BT device that is having the BT connection link (step S6, NO), the process also proceeds to the first BT connection request processing (step S5).

In contrast, if the streaming data packet transfer profile is determined as being connected to the other BT device that is having the BT connection link (step 6, YES), the process proceeds to the second BT connection request processing (step S7).

When the control unit 2 performs the second BT connection request processing, the control unit 2 determines whether an amount of streaming data stored in data store unit 4a at the moment exceeds a threshold (step S11). When the data amount is determined as exceeding the threshold (step S11, YES), the control unit 2 determines whether the reception of the data packet of the streaming data has completed (step S12). If the data packet reception is determined as having completed (step S12, YES), the control unit 2 starts operation to transmit a page command to the requesting BT device from the BT interface unit 3 for starting a BT connection request for the requesting BT device which is a partner of the connection request (step S13).

Subsequently, the control unit 2 starts a timer (i.e., a BT connection request start timer: S-TIMER in FIG. 3) for counting an elapsed time after staring a BT connection request (step S14), and increments a counter (i.e., a BT connection request counter) for counting the number of BT connection requests (step S15). Then, the control unit 2 determines whether the first set time has elapsed (step S16), and also determines whether the requesting BT device which is a connection request partner has responded to a BT connection request (step S17).

The first set time mentioned above (i.e., a connection request execution time in the claim language) satisfies a condition that, for a duration of the first set time during which the data play unit 4b can continuously play the streaming data stored in the data store unit 4a, the other BT device to which the BT interface unit 3 is already connecting, at the moment, a BT connection link does not transmit streaming data. Therefore, the first set time should satisfy a condition that the first set time has a value that is smaller (or shorter) than X1 divided by S1, when X1 (byte) defines the data amount of the streaming data stored in the data store unit 4a at the moment, and S1 (byte/sec) defines the data play speed by the data play unit 4b. That is, as shown in FIG. 4, when a time Ta (sec) is defined as a page command transmission time, the time Ta should satisfy a condition of $$Ta < X1/S1,$$

which is set in advance by the control unit 2. The time Ta is the connection request execution time mentioned above.

Subsequently, the control unit 2 proceeds to BT connection processing to connect a BT connection link to the BT device (step S18) when the BT device is determined as having responded to a BT connection request before a lapse of the first set time counted by the timer (step S17, YES).

In contrast, when the control unit 2 determines that the timer counted time reaches the first set time without having a response to the BT connection request from the BT device (step S16, YES), the control unit 2 interrupts operation to transmit, from the BT interface unit 3, a page command to the BT device which is a connection request partner, and a BT connection request for the BT device which is a connection request partner (step S19).

Subsequently, the control unit 2 initializes a BT connection request start timer (i.e., a time count of the timer is set to zero) (step S20), and determines whether an incremented BT connection request counter has reached a preset number of counts (step S21). In this case, when the control unit 2 determines that the preset number of counts has not been reached (step S21, NO), it starts a BT connection request interrupt timer (i.e., I-TIMER in FIG. 3) for counting a time after interruption of the BT connection request (step S22), and then determines whether the second set time has elapsed according to the BT connection request interrupt timer (step S23). When the second set time is determined as having elapsed by the control unit 2 according to the interrupt timer (step S23, YES), the interrupt timer is initialized (i.e., time count is reset to zero) (step S24), and the process returns to S11 for repeating the above-described processing.

The second set time is a time required for storing a preset amount of streaming data in the data store unit 4a in a time slot of streaming data transmission by the other BT device that has a BT connection link with the BT interface unit 3 for the purpose of transmitting the streaming data. If the streaming data to be stored in the data store unit 4a is designated as X2 (byte), and a data store speed by the data store unit 4a is designated as S2 (byte/sec), the second set time should have a value greater than X2 divided by (S2−S1). In other words, when a time Tb represents a time between an interruption of the page command transmission and a restart of the page command transmission as shown in FIG. 4, the time Tb should satisfy a condition $$Tb > X2/(S2-S1),$$

which is set in advance by the control unit 2.

Further, the preset number of counts is the value that is calculated by dividing the preset time of 5.12 seconds, which is set for the continuous page command transmission time until having a response from the BT device, by the page command transmission time Ta, when the time Ta takes a constant value. That is, when the preset number of counts is designated as "n," the count n should satisfy a condition $$n = 5.12/Ta,$$

which is set in advance by the control unit 2.

The handsfree apparatus 1 operates in the above-described operation scheme, thereby resulting in that:

(a) a connection request of the BT connection link to the BT phone 21 is generated, when the user turns on a power supply of the BT phone 21, for example, at a time during which A2DP is being connected to the audio player 22 while the streaming data transmitted from the audio player 22 is being played, if the user has brought the BT phone 21 together with the audio player 22 into the vehicle compartment, and (b) an operation for handling the connection request of the BT connection link is performed by transmitting the page command to the BT phone 21 on a condition that a time slot (i) that does not have packet transfer of the music streaming data from the audio player 22, and (ii) that allows a continuous playback of the music streaming data by the audio player 22, is allocated. In this case, the BT phone 21 is a short range wireless communication device in the claim language, and the audio player 22 is the other short range wireless communication device in the claim language.

In addition, in the above description of the operation scheme, the time Ta for transmitting the page command and the time Tb to restart the page command transmission after the interruption of the page command transmission are respectively set based on (a) the streaming data play speed S1 (byte/sec) for playing the data in the data store unit 4a by the data play unit 4b and subsequently based on (b) the streaming data store speed S2 (byte/sec) for storing the data in the data store unit 4a. However, the times Ta and Tb may be set time after time by continuously examining the data amount of the streaming data stored in the data store unit 4a.

As described above, the handsfree apparatus 1 of the present embodiment enables an appropriate handling of the connection request of BT connection link to the BT phone 21 while continuously playing the music streaming data transmitted from the audio player 22 without interruption, thereby achieving an improved user satisfaction in terms of continuously playing the music streaming data without interruption/disruption by preventing a possible interruption of the streaming data. The above advantageous effects are achieved (a) by guaranteeing the continuous playback of the music steaming data in a time slot during which the audio player 22 does not transmit the data packet of the music streaming data, and (b) by subsequently performing an operation to request for the BT connection link to the BT phone 21, when the A2DP is being connected to the audio player 22 for the packet transfer of the music streaming data at a time of generating the connection request of the BT connection link to the BT phone 21.

Although the present disclosure has been fully described in connection with preferred embodiment thereof with reference to the accompanying drawings, it is to be noted that various changes and modifications will become apparent to those skilled in the art.

For example, the streaming data playback unit with the short range wireless communication function may be a vehicle apparatus that is different from the vehicle handsfree apparatus, that is, the playback unit may be a navigation apparatus, and the profile that defines packet transfer of the streaming data for a non-vehicle apparatus may be a profile other than A2DP, as long as the profile defines the packet transfer of the streaming data.

Further, the steaming data may be, for example, a movie streaming data, or other type of streaming data, if not the music streaming data.

Such changes, modifications, and summarized schemes are to be understood as being within the scope of the present disclosure as defined by appended claims.

What is claimed is:

1. A streaming data playback apparatus comprising:
a short range wireless communication unit capable of simultaneously establishing multiple links of short range wireless communication with a plurality of short range wireless communication devices;
a streaming data storage unit storing streaming data that has been transferred from a first short range wireless communication device when a short range wireless communication with the first short range wireless communication device is connected through a short range wireless communication protocol that regulates a packet transfer of the streaming data;
a streaming data playback unit continuously playing the streaming data stored in the streaming data storage unit; and
a control unit controlling a request operation that requests a connection of a short range wireless communication link to a second short range wireless communication device by the short range wireless communication unit, wherein
the control unit causes the short range wireless communication unit to perform the request operation that requests the connection of the short range wireless communication link to the second short range wireless communication device when the connection request of the short range wireless communication link to the second short range wireless communication device is generated at a time during which the short range wireless communication unit is in the short range wireless communication protocol connected condition that regulates the packet transfer of the streaming data with the first short range wireless communication device under a condition that the streaming data stored in the streaming data storage unit provided by the first short range communication device can be continuously played in a time slot that does not have the transfer of the data packet of the streaming data from the first short range wireless communication device.

2. The streaming data playback apparatus of claim 1, wherein
the control unit calculates a continuous playback time required for playing the streaming data stored in the streaming data storage unit by dividing an amount of the streaming data by a playback speed of continuous playing by the streaming data playback unit,
the control unit sets, as a connection request execution time, a period that is shorter than the calculated continuous playback time, and
the control unit causes the short range wireless communication unit to perform the request operation that requests a connection of the short range wireless communication link to the second short range wireless communication device for a time amount of the connection request execution time in the time slot that does not have the transfer of the data packet of the streaming data from the first short range wireless communication device.

3. A streaming data playback apparatus comprising:
a short range wireless communication unit capable of simultaneously establishing multiple links of short range wireless communication with a plurality of short range wireless communication devices:
a streaming data storage unit storing streaming data that has been transferred from a short range wireless communication device when a short range wireless communication with the first short range wireless communication device is connected through a short range wireless communication protocol that regulates a packet transfer of the streaming data;
a streaming data playback unit continuously playing the streaming data stored in the streaming data storage unit; and
a control unit controlling a request operation that requests a connection of a short range wireless communication link to a second short range wireless communication device by the short range wireless communication unit, wherein
the control unit causes the short range wireless communication unit to perform the request operation that requests the connection of the short range wireless communication link to the second short range wireless communication device when the connection request of the short range wireless communication link to the second short range wireless communication device is generated at a time during which the short range wireless communication unit is in the short range wireless communication protocol connected condition that regulates the packet transfer of the streaming data with the first short range wireless communication device under a condition that the streaming data stored in the streaming data storage unit provided by the first short range communication device can be continuously played while the connection of the short range wireless communication link to the second short range wireless communication device is established.

* * * * *